United States Patent
Lehtinen et al.

(10) Patent No.: US 10,097,218 B2
(45) Date of Patent: Oct. 9, 2018

(54) RADIO FREQUENCY CIRCUIT AND COMMUNICATION DEVICE MODULE

(71) Applicant: HUAWEI TECHNOLOGIES CO., LTD., Shenzhen, Guangdong (CN)

(72) Inventors: Teijo Henrikki Lehtinen, Helsinki (FI); Chun Wei Min, Shenzhen (CN); Bruno Biscontini, Munich (DE); Mattias Gustafsson, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/683,070

(22) Filed: Aug. 22, 2017

(65) Prior Publication Data
US 2017/0353198 A1  Dec. 7, 2017

Related U.S. Application Data

(63) Continuation of application No. PCT/EP2015/053679, filed on Feb. 23, 2015.

(51) Int. Cl.
*H04B 1/04*   (2006.01)
*H04B 7/10*   (2017.01)

(52) U.S. Cl.
CPC ......... *H04B 1/0458* (2013.01); *H04B 1/0475* (2013.01); *H04B 7/10* (2013.01); *H04B 2001/0408* (2013.01)

(58) Field of Classification Search
CPC ...... H04B 1/0458; H04B 1/0475; H04B 7/10; H04B 2001/0408; H04B 1/0092; H04B 1/04
See application file for complete search history.

(56) References Cited

U.S. PATENT DOCUMENTS

| | | |
|---|---|---|
| 6,169,513 B1 | 1/2001 | Cohen |
| 6,816,124 B2 | 11/2004 | Tillery |
| 7,084,815 B2 | 8/2006 | Phillips et al. |
| 7,196,674 B2 | 3/2007 | Timofeev et al. |

(Continued)

FOREIGN PATENT DOCUMENTS

| | | |
|---|---|---|
| EP | 2487800 A1 | 8/2012 |
| GB | 2517218 | 2/2015 |
| WO | 2012/158045 A2 | 11/2012 |

OTHER PUBLICATIONS

International Search Report dated Oct. 21, 2015 in corresponding International Patent Application No. PCT/EP2015/053679.

(Continued)

*Primary Examiner* — Andrew Wendell
(74) *Attorney, Agent, or Firm* — Staas & Halsey LLP (57) ABSTRACT

A radio frequency circuit is described, which comprises a first power amplifier comprising a first output, a second power amplifier comprising a second output, a third power amplifier comprising a third output, and a fourth power amplifier comprising a fourth output. The first power amplifier, the second power amplifier, the third power amplifier and the fourth power amplifier are configured to perform an amplification based on a radio communication signal to produce a first amplifier output signal, a second amplifier output signal, a third amplifier output signal, and a fourth amplifier output signal. Furthermore, the present application also relates to a transmitter comprising such a radio frequency amplifier circuit.

14 Claims, 5 Drawing Sheets

(56) References Cited

U.S. PATENT DOCUMENTS

| | | |
|---|---|---|
| 7,538,741 B2 | 5/2009 | Castaneda et al. |
| 2007/0224949 A1 | 9/2007 | Morton et al. |
| 2008/0204134 A1* | 8/2008 | Knickerbocker ......... H01P 5/16 |
| | | 330/124 R |
| 2009/0130990 A1 | 5/2009 | Rofougaran |
| 2012/0105149 A1* | 5/2012 | Saiz ........................ H03F 3/211 |
| | | 330/124 R |
| 2012/0212384 A1 | 8/2012 | Kam et al. |
| 2012/0280752 A1 | 11/2012 | Jones et al. |
| 2013/0005392 A1* | 1/2013 | Chen .................... H04B 1/0057 |
| | | 455/550.1 |
| 2014/0072001 A1* | 3/2014 | Chang .................. H04B 1/0064 |
| | | 370/542 |
| 2015/0094008 A1* | 4/2015 | Maxim ............... H01F 17/0013 |
| | | 455/245.1 |
| 2015/0110058 A1* | 4/2015 | Shapira ................ H04B 1/3805 |
| | | 370/329 |
| 2015/0194941 A1* | 7/2015 | Lee ........................ H03F 3/602 |
| | | 370/278 |

OTHER PUBLICATIONS

Written Opinion of the International Searching Authority dated Oct. 21, 2015 in corresponding International Patent Application No. PCT/EP2015/053679.

* cited by examiner

RADIO FREQUENCY CIRCUIT AND COMMUNICATION DEVICE MODULE

CROSS-REFERENCE TO RELATED APPLICATIONS

This application is a continuation of International Application No. PCT/EP2015/053679, filed on Feb. 23, 2015, the disclosure of which is hereby incorporated by reference in its entirety.

TECHNICAL FIELD

The present application relates to a radio frequency amplifier circuit. Furthermore, the present application also relates to a transmitter comprising such a radio frequency amplifier circuit.

BACKGROUND

Normally, Base-Station (BS) antenna elements are fed from a central RF system, with a few powerful transmitting Power Amplifiers (PAs), duplex filters and a large complex transmission line system to distribute the power to all the different antenna elements. The power distributed to each antenna element must further be distributed in such a way so that each element will get the most suitable amplitude and phase weights so that the most optimal beams will be shaped. With optimal beam we mean the beam-forming that from a system perspective maximizes the Signal to Interference and Noise Ratios (SINRs) per user.

With massive Multiple Input Multiple Output (MIMO) systems comes the possibility to systemize the base-station antenna in a completely different way. We can discard the complicated feeding system and instead locate small active Radio Frequency (RF) circuits (like PAs and LNAs and other circuitry) very close to the antenna elements. The reason for this is that massive MIMO, by its fundamental principles is based on the fact that baseband processing involves very many base-station antenna elements, and active analogue circuits and AD/DA conversion must hence be done as close to the antenna elements as possible. For a conventional BS antenna, we have at its interface two ports for the complete array, each port normally feeding one of two orthogonal polarizations. Each port comprises one so called TX-port for a transmitter signal and one so called RX-port for a receiver signal.

For a massive MIMO BS antenna, we have at the interface a large number of ports, possibly one port for each antenna element in the complete array. One antenna element may constitute two radiators, each radiator having a different polarization compared to the other radiator. Each radiator in turn may be composed of two sub-radiators, each sub-radiator having same polarization. Each port is normally feeding one of two orthogonal polarizations. An antenna normally has two ports, one port for transmission and reception in one polarization, and another port for transmission and reception in another polarization. Between each port and its corresponding antenna element there is usually a TRX circuit including filter, mixer and amplification. It is readily understood that a MIMO antenna facilitates a higher number of antenna ports even if the actual number of antenna elements for the MIMO antenna is the same as for the conventional traditional antenna.

It is desirable to use inexpensive components in the amplifiers driving the antenna elements. One cheap technology that may be used for the components in the amplifiers is CMOS in which the breakdown voltages are typically in the order of a few volts. An example is a class-A linear power amplifier that allows 3.6V peak-to-peak voltage swing (Vpp). Class-A PA is here used as an example, and it is assumed that Vpp is simply twice the supply voltage, Vs. Special high voltage transistors, such as extended-drain MOS can be used, but that often requires additional expensive process options and also the transistor performances are often poorer. If the maximum drain voltage swing allowed by the breakdown voltages is 3.6 V, the output impedance to drive total 2 W towards the antenna would require a practically unusable output impedance of 0.8Ω for this example. Such low impedances leads to enormous currents that are extremely sensitive to resistive losses. And since practical antenna impedances are normally in the region between tenths of ohms up to hundreds of ohms, and the loss and bandwidth of an impedance Matching Network (MNW) depends on the impedance transformation ratio, the matching network would be lossy and narrow-band.

SUMMARY

An objective of the present application is to provide a solution which mitigates or solves the drawbacks and problems of conventional solutions.

Another objective of the present application is to provide an alternative amplifier and antenna architecture which enables the use of low cost technology to achieve a higher antenna output than what is possible with conventional solutions.

Another objective of the present application is to provide a transmitter comprising an amplifier and an antenna which enables the use of low cost technology to achieve a higher antenna output than what is possible with conventional solutions.

An "or" in this description and the corresponding claims is to be understood as a mathematical OR which covers "and" and "or", and is not to be understood as an XOR (exclusive OR).

The above objectives are fulfilled by the subject matter of the independent claims. Further advantageous implementation forms of the present application can be found in the dependent claims.

According to a first aspect of the present application a radio frequency (amplifier) circuit is provided which comprises a first power amplifier comprising a first output, a second power amplifier comprising a second output, a third power amplifier comprising a third output, and a fourth power amplifier comprising a fourth output. The first power amplifier, the second power amplifier, the third power amplifier and the fourth power amplifier are configured to perform an amplification based on a radio communication signal to produce a first amplifier output signal, a second amplifier output signal, a third amplifier output signal, and a fourth amplifier output signal. The first output is configured to provide the first amplifier output signal to a first feed point of a first radiator. The second output is configured to provide the second amplifier output signal to a second feed point of the first radiator. The third output is configured to provide the third amplifier output signal to a third feed point of the first radiator. The fourth output is configured to provide the fourth amplifier output signal to a fourth feed point of the first radiator.

In this application radio frequency may mean the frequency range from 1 MHz to 300 GHz.

In this application the word radiator is used. In the application the word antenna is also used. An antenna may comprise one or more radiators. Each radiator is configured to radiate in a specific polarization direction. Each radiator may in turn comprise two sub-radiators, wherein both sub-radiators are configured to radiate in the same polarization direction.

With a radio frequency circuit according to the first aspect of the application each power amplifier may have a lower output for a specific total emitted power of the first radiator compared to conventional technology in which a smaller number of power amplifier outputs are used to feed a radiator. This makes it possible to avoid complicated combiners and high power amplifiers. This in turn makes it possible to use integrated amplifiers based on low cost process technology. This provides cost saving in the radio frequency (amplifier) circuit.

In a first possible implementation form of the radio frequency circuit according to the first aspect, the radio frequency circuit, further comprises a first front end network and a second front end network. The first output is coupled to the first feed point via the first front end network. The second output is coupled to the second feed point via the first front end network. The third output is coupled to the third feed point via the second front end network. The fourth output is coupled to the fourth feed point via the second front end network.

The front end networks may comprise different components such as matching networks and filters. The provision of the front end networks simplifies the construction of the power amplifiers.

In a second possible implementation form of the radio frequency circuit according to the first aspect, the radio frequency circuit further comprises a first front end network, a second front-end network, a third front end network and a fourth front end network. The first output is coupled to the first feed point via the first front end network. The second output is coupled to the second feed point via the second front end network. The third output is coupled to the third feed point via the third front end network. The fourth output is coupled to the fourth feed point via the fourth front end network.

The provision of front end networks makes the implementation of the power amplifiers easier. The front end networks may comprise impedance matching networks, filters, and switches.

In a third possible implementation form of the radio frequency circuit according to any of the preceding implementation forms of the first aspect or to the first aspect as such, the first power amplifier, the second power amplifier, the third power amplifier and the fourth power amplifier are integrated into a common integrated circuit chip.

According to the third possible implementation form of a radio frequency circuit a larger number of amplifier outputs are provided. Thus, for a predetermined total power output from a radio frequency circuit the power output from each output in the radio frequency circuit according to the first aspect of the application may be lower than in a radio frequency according to conventional technology. The lower output power from each output in the radio frequency circuit according to the first aspect of the present application makes it possible to use power amplifiers integrated into a common integrated circuit chip. This is a cheaper solution compared to using discrete components which may be necessary in some solutions according to conventional technology.

In a fourth possible implementation form of a radio frequency circuit according to any of the preceding implementation forms of the first aspect or to the first aspect as such, at least the first power amplifier is a differential power amplifier.

By having at least one of the amplifiers configured as a differential power amplifier the possible voltage swing of the amplifiers may be used more efficiently.

In a fifth possible implementation form of a radio frequency circuit according to any of the preceding implementation forms of the first aspect or to the first aspect as such, at least the first power amplifier comprises a first pair of single ended power amplifiers and a first combiner, wherein each single ended power amplifier of the first pair is configured to perform an amplification based on the radio communication signal, wherein the first combiner is coupled between outputs of the single ended power amplifiers of the first pair and the first output of the first power amplifier to provide the first amplifier output signal.

By configuring at least the first power amplifier as in the fifth possible implementation form with a first pair of single ended power amplifiers and a first combiner the implementation of the amplifier is simplified while the efficiency of the amplifier is also improved compared to a radio frequency power amplifier according to conventional architecture using the same process technology.

In a sixth possible implementation form of a radio frequency circuit according to any of the preceding implementation forms of the first aspect or to the first aspect as such, the radio communication signal is a differential radio communication signal having a first component signal and a second component signal. The first power amplifier is configured to perform an amplification based on the first component signal to produce the first amplifier output signal. The second power amplifier is configured to perform an amplification based on the second component signal to produce the second amplifier output signal. The third power amplifier is configured to perform an amplification based on the first component signal to produce the third amplifier output signal. The fourth power amplifier is configured to perform an amplification based on the second component signal to produce the fourth amplifier output signal.

By configuring the power amplifiers in this way the efficiency of the radio frequency circuit is improved compared with radio frequency amplifier circuits according to conventional architecture, for example, using the same process technology.

In a seventh possible implementation form of a radio frequency circuit according to any of the preceding implementation forms of the first aspect or to the first aspect as such, the radio frequency circuit, further comprises a fifth power amplifier comprising a fifth output, a sixth power amplifier comprising a sixth output, a seventh power amplifier comprising a seventh output, and an eighth power amplifier comprising an eighth output. The fifth power amplifier, the sixth power amplifier, the seventh power amplifier, and the eighth power amplifier are configured to perform an amplification based on a further radio communication signal to produce a fifth amplifier output signal, a sixth amplifier output signal, a seventh amplifier output signal, and an eighth amplifier output signal. The fifth output is configured to provide the fifth component signal to a fifth feed point of a second radiator. The sixth output is configured to provide the sixth component signal to a sixth feed point of the second radiator. The seventh output is configured to provide the seventh component signal to a seventh feed point of the second radiator. The eighth output is configured to provide the eighth component signal to an eighth feed point of the second radiator.

The radio frequency circuit according to the seventh possible implementation form is suitable for feeding power to two radiators, which each have two subradiators. The radio frequency circuit according to the seventh possible implementation form provides a more efficient solution for achieving the radiated power target than the radio frequency amplifier circuits according to conventional technology. By having eight outputs the power output on each output may be considerably lower for a certain total power output than what is necessary with conventional radio frequency amplifier circuits.

The lower power per output makes it possible to integrate the power amplifiers on a common integrated circuit chip. Thus, in an eighth possible implementation form of a radio frequency circuit according to any of the preceding implementation forms of the first aspect or to the radiofrequency circuit as such, the first power amplifier, the second power amplifier, the third power amplifier, the fourth power amplifier, the fifth power amplifier, the sixth power amplifier, the seventh power amplifier, and the eighth power amplifier are integrated into a common integrated circuit chip. The possible total power output from a radio frequency power amplifier according to the eighth possible implementation form is higher than the possible total power output from a radio frequency power amplifier according to conventional technology in which the amplifiers are integrated on a common integrated circuit chip.

According to a second aspect of the present application a communication device module is provided, the communication device module comprises a radio frequency circuit according to any of the preceding implementation forms of the first aspect or to the first aspect as such, and the first radiator. The first radiator comprises a first sub-radiator and a second sub-radiator, wherein the first sub-radiator comprises the first feed point and the second feed point, and wherein the second sub-radiator comprises the third feed point and the fourth feed point.

By having two differential feed points on each radiator a certain power output from the radiator may be achieved with less power on each feed point as is necessary with transmitter devices according to conventional architecture. This enables a simplified and more efficient configuration of the transmitter than what is possible with transmitters according to conventional methods.

In a first possible implementation form of a communication device module according to the second aspect, the first sub-radiator is configured to radiate in a first polarization direction, and the second sub-radiator is configured to also radiate in the first polarization direction.

Thus, the sub-radiators are cooperating in radiating in the first polarization direction. This first possible implementation form provides the advantage of a higher output in a first polarization direction without increasing the power output from a single power amplifier.

In a second possible implementation form of a radio frequency circuit according to the second aspect, the communication device module comprises a radio frequency circuit according to any of the seventh and eighth possible implementation form of a radio frequency circuit of the first aspect, and the first radiator and the second radiator. The first radiator comprises a first sub-radiator and a second sub-radiator. The first sub-radiator comprises the first feed point and the second feed point. The second sub-radiator comprises the third feed point and the fourth feed point. The second radiator comprises a third sub-radiator and a fourth sub-radiator, wherein the third sub-radiator comprises the fifth feed point and the sixth feed point, and wherein the fourth sub-radiator comprises the seventh feed point and the eighth feed point.

This second possible implementation form provides a communication device module that may output a higher total power in two polarization directions.

The output of radiation in two polarization directions may be provided with a communication device module according to a third possible implementation form of a radio communication device module according to the second implementation form of the second aspect, in which third possible implementation form the first sub-radiator is configured to radiate in a first polarization direction, and the second sub-radiator is configured to also radiate in the first polarization direction.

In a fourth possible implementation form of a radio communication device module according to the third implementation form of the second aspect, the third sub-radiator is configured to radiate in a second polarization direction, wherein the fourth sub-radiator is configured to also radiate in the second polarization direction, and wherein the first polarization direction is different from the second polarization direction.

The third and fourth possible implementation forms of a radio communication device provide implementations which may provide a higher output power in one or two polarization directions without increasing the power from a single output of the radio frequency amplifier circuit.

In a fifth possible implementation form of a radio communication device module according to the fourth implementation form of the second aspect, the first polarization direction is perpendicular to the second polarization direction.

This fifth possible implementation form is a favourable configuration of the radiators in the radio transmitter.

DETAILED DESCRIPTION

In the following detailed description of embodiments of the invention the same reference numeral will be used for the corresponding feature in the different drawings.

Figure 1:
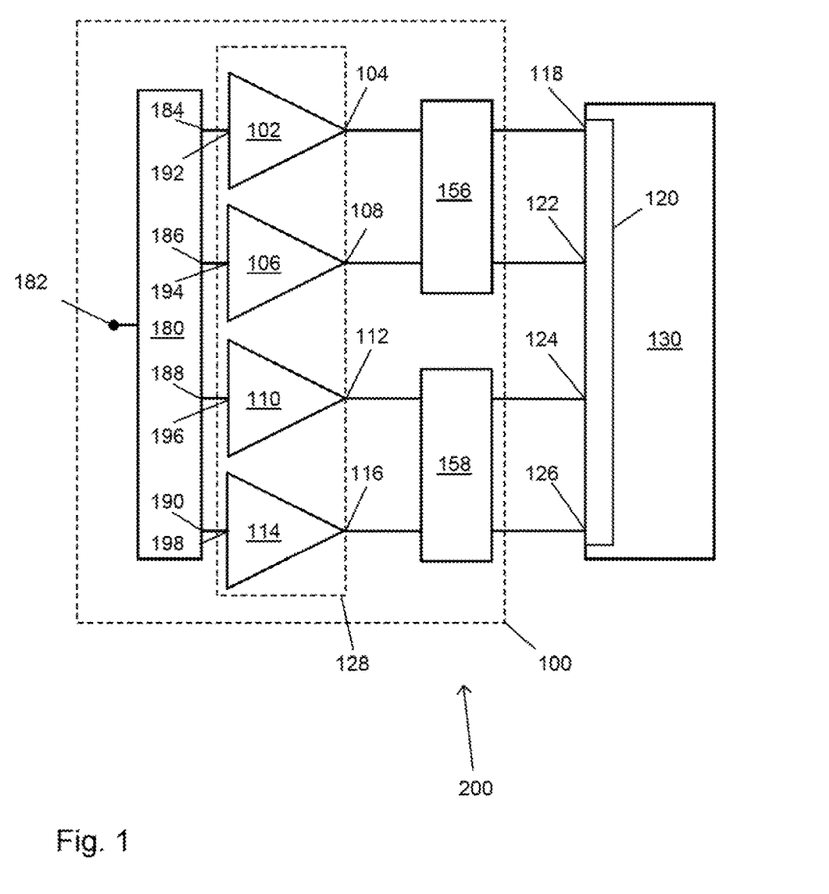
FIG. 1 shows schematically a communication device module according to a first embodiment of the present invention, which communication device module comprises a radio frequency circuit according to a first embodiment.

FIG. 1 shows schematically a communication device module 200 according to an embodiment of the present invention. The communication device module 200 comprises a radio frequency circuit 100 according to a first embodiment. The communication device module 200 also comprises a first radiator 120, which comprises a first feed point 118, a second feed point 122, a third feed point 124 and a fourth feed point 126. The radio frequency circuit 100 comprises a first power amplifier 102 comprising a first output 104 and a first input 192, a second power amplifier 106 comprising a second output 108 and a second input 194, a third power amplifier 110 comprising a third output 112 and a third input 196, and a fourth power amplifier 114 comprising a fourth output 116 and a fourth input 198. The radio frequency circuit 100 further comprises an optional transmitter network 180 with an input 182 for a radio communication signal. The transmitter network 180 further comprises a first network output 184 connected to the first input 192 of the first power amplifier 102, a second network output 186 connected to the second input 194 of the second power amplifier 106, a third network output 188 connected to the third input 196 of the third power amplifier 110, and a fourth network output 190 connected to the fourth input 198 of the fourth power amplifier 114. The first power amplifier 102, the second power amplifier 106, the third power amplifier 110 and the fourth power amplifier 114 are configured to perform an amplification based on the radio communication signal to produce a first amplifier output signal, a second amplifier output signal, a third amplifier output signal, and a fourth amplifier output signal. The first output 104 is configured to provide the first amplifier output signal to the first feed point 118 of the first radiator 120. The second output 108 is configured to provide the second amplifier output signal to the second feed point 122 of the first radiator 120. The third output 112 is configured to provide the third amplifier output signal to the third feed point 124 of the first radiator 120. The fourth output 116 is configured to provide the fourth amplifier output signal to the fourth feed point 126 of the first radiator 120. The total emitted radiation from the first radiator 120 is thus provided from four different power amplifiers. This enables a high output power of the radiation from the first radiator 120 using low cost power amplifiers, such as, e.g., CMOS based power amplifiers.

The communication device module 200 also comprises an optional first front end network 156 and an optional second front end network 158. The first output 104 is coupled to the first feed point 118 via the first front end network 156. The second output 108 is coupled to the second feed point 122 via the first front end network 156. The third output 112 is coupled to the third feed point 124 via second front end network 158. The fourth output 116 is coupled to the fourth feed point 126 via the second front end network 158. Thus, in contrast to systems according to conventional solutions, four power amplifiers feed the radiator in four feed points. In conventional solutions only one or two feed points are used. This requires the amplifiers in conventional solutions to feed more power into each feeding point than what is required in this embodiment of the invention. The lower power requirement for the amplifiers in this embodiment of the invention allow the first power amplifier 102, the second power amplifier 106, the third power amplifier 110 and the fourth power amplifier 114 to be integrated into a first common integrated circuit chip 128 as is indicated by the dashed line in FIG. 1. The first common integrated circuit chip 128 may be based on different technologies, such as MOSFET and CMOS.

The radio communication signal applied to the input 182 may be a differential radio communication signal having a first component signal and a second component signal. The first power amplifier 102 is configured to perform an amplification based on the first component signal to produce the first amplifier output signal. The second power amplifier 106 is configured to perform an amplification based on the second component signal to produce the second amplifier output signal. The third power amplifier 110 is configured to perform a further amplification based on the first component signal to produce the third amplifier output signal. The fourth power amplifier 114 is configured to perform a further amplification based on the second component signal to produce the fourth amplifier output signal.

Figure 2:
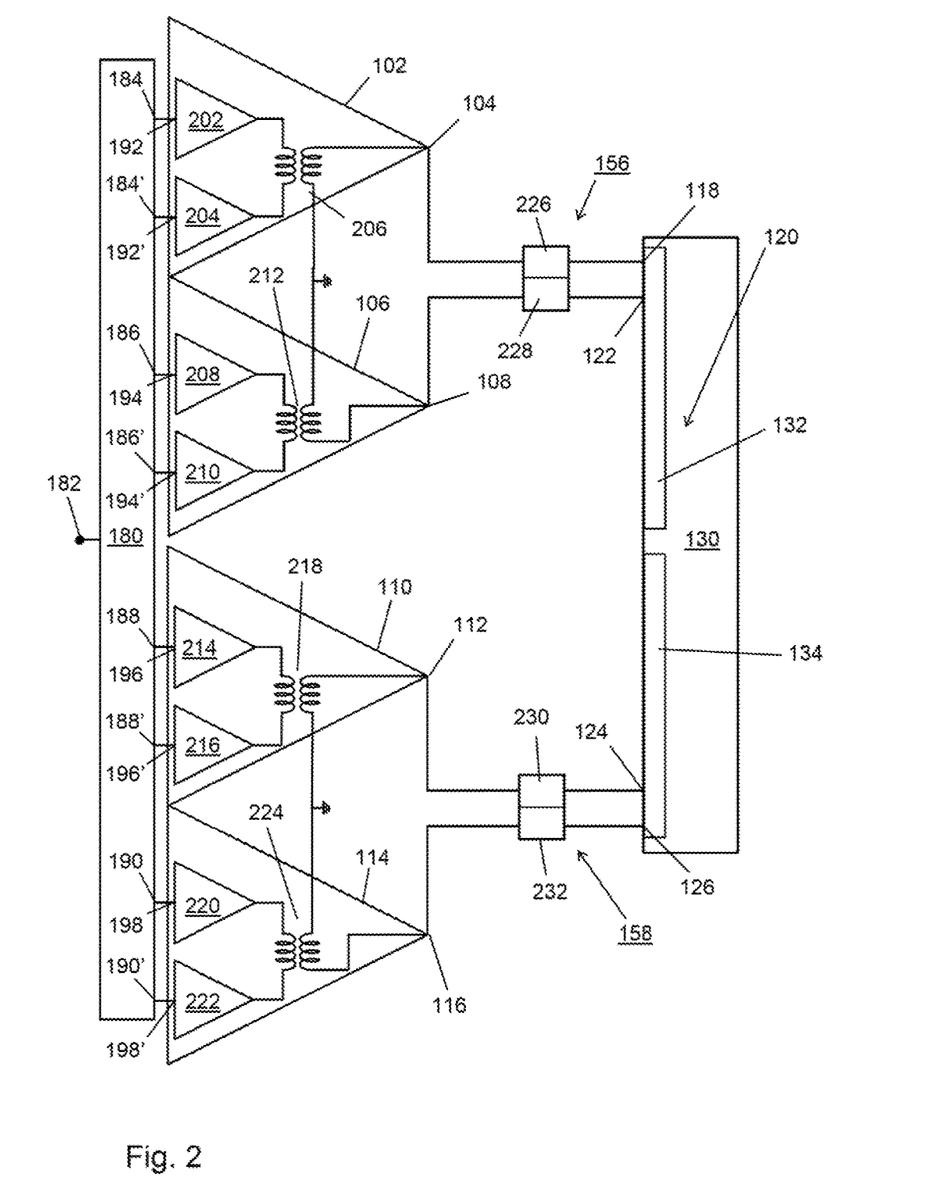
FIG. 2 shows in larger detail a communication device module and a radio frequency circuit according to the embodiment shown in FIG. 1.

FIG. 2 shows in more detail a communication device module and a radio frequency circuit 100 according to the embodiment shown in FIG. 1. The details of the communication device module 200 that have already been described in relation to FIG. 1 will not be repeated here. The first power amplifier 102 comprises a first pair of single ended power amplifiers in the form of a first single ended power amplifier 202, and a second single ended power amplifier 204, and a first combiner 206 in the form of a first transformer. Each single ended power amplifier 202, 204, of the first pair is configured to perform an amplification based on the radio communication signal. The first combiner 206 is coupled between outputs of the single ended power amplifiers 202, 204, of the first pair and the first output 104 of the first power amplifier 102 to provide the first amplifier output signal. The second power amplifier 106 comprises a third single ended power amplifier 208 and a fourth single ended power amplifier 210. The third single ended power amplifier 208 and the fourth single ended power amplifier 210 are connected via a second combiner 212, in the form of a transformer, to the second output 108 of the second power amplifier 106. The third power amplifier 110 comprises a fifth single ended power amplifier 214 and a sixth single ended power amplifier 216. The fifth single ended power amplifier 214 and the sixth single ended power amplifier 216 are connected via a third combiner 218, in the form of a transformer, to the third output 112 of the third power amplifier 110. The fourth power amplifier 114 comprises a seventh single ended power amplifier 220 and an eighth single ended power amplifier 222. The seventh single ended power amplifier 220 and the eighth single ended power amplifier 222 are connected via a fourth combiner 224, in the form of a transformer 224 to the fourth output 116 of the fourth power amplifier 114.

The embodiment shown in FIG. 2 is a favourable implementation of a radio frequency circuit 100. As has been described above the first power amplifier 102, the second power amplifier 106, the third power amplifier 110 and the fourth power amplifier 114 may be integrated into a first common integrated circuit chip 128. The first common integrated circuit chip 128 may be based on different technologies, such as, e.g., CMOS and MOSFET. The radio frequency circuit 100 comprises a first front end network 226, a second front end network 228, a third front end network 230 and a fourth front end network 232. The first output 104 is coupled to the first feed point 118 via the first front end network 226. The second output 108 is coupled to the second feed point 122 via the second front end network 228. The third output 112 is coupled to the third feed point 124 via the third front end network 230. The fourth output 116 is coupled to the fourth feed point 126 via the fourth front end network 232. The first power amplifier 102, the second power amplifier 106, the third power amplifier 110, and the fourth power amplifier 114 are configured as differential power amplifiers.

The first radiator 120 comprises a first sub-radiator 132 and a second sub-radiator 134. The first sub-radiator 132 comprises the first feed point 118 and the second feed point 122. The second sub-radiator 134 comprises the third feed point 124 and the fourth feed point 126.

Preferably, the first sub-radiator 132 is configured to radiate in a first polarization direction, and the second sub-radiator 134 is configured to also radiate in the first polarization direction.

Figure 3:
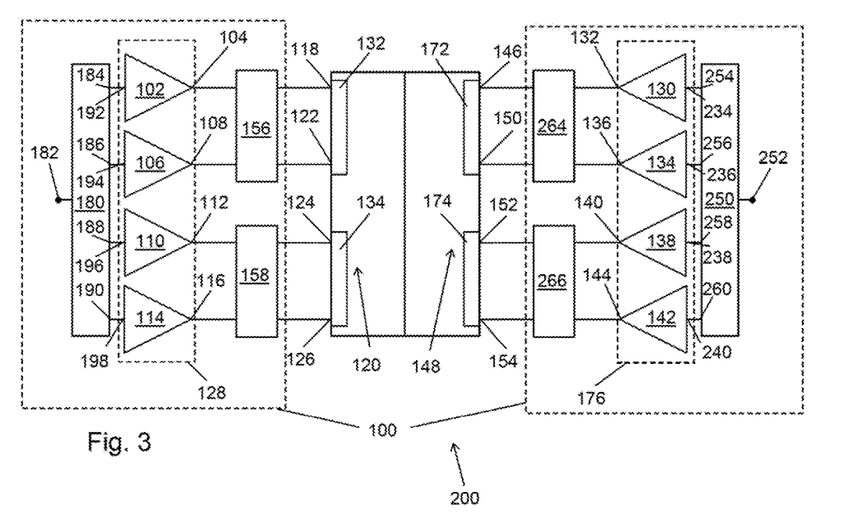
FIG. 3 shows schematically a communication device module according to a second embodiment of the present invention, which communication device module comprises a radio frequency circuit according to a second embodiment.

FIG. 3 shows schematically a communication device module 200 according to a second embodiment, which communication device module comprises a radio frequency circuit 100 according to a second embodiment of the invention. The communication device module 200 comprises a first radiator 120, and a second radiator 148. The first radiator and the second radiator together form an antenna element. The first radiator 120 comprises a first sub-radiator 132 and a second sub-radiator 134. The first sub-radiator 132 comprises a first feed point 118 and a second feed point 122. The second sub-radiator 134 comprises a third feed point 124 and a fourth feed point 126. The second radiator 148 comprises a third sub-radiator 172 and a fourth sub-radiator 174. The third sub-radiator 172 comprises the fifth feed point 146 and the sixth feed point 150. The fourth sub-radiator 174 comprises the seventh feed point 152 and the eighth feed point 154. The radio frequency circuit 100 comprises a first power amplifier 102 comprising a first output 104 and a first input 192, a second power amplifier 106 comprising a second output 108 and a second input 194, a third power amplifier 110 comprising a third output 112 and a third input 196, and a fourth power amplifier 114 comprising a fourth output 116 an a fourth input 198. The radio frequency circuit 100 further comprises an optional transmitter network 180 with an input 182 for a (differential) radio communication signal. The transmitter network 180 further comprises a first network output 184 connected to the first input 192 of the first power amplifier 102, a second network output 186 connected to the second input 194 of the second power amplifier 106, a third network output 188 connected to the third input 196 of the third power amplifier 110, and a fourth network output 190 connected to the fourth input 198 of the fourth power amplifier 114. The first power amplifier 102, the second power amplifier 106, the third power amplifier 110 and the fourth power amplifier 114 are configured to perform an amplification based on the radio communication signal to produce a first amplifier output signal, a second amplifier output signal, a third amplifier output signal, and a fourth amplifier output signal. The first output 104 is configured to provide the first amplifier output signal to the first feed point 118 of the first radiator 120. The second output 108 is configured to provide the second amplifier output signal to the second feed point 122 of the first radiator 120. The third output 112 is configured to provide the third amplifier output signal to the third feed point 124 of the first radiator 120. The fourth output 116 is configured to provide the fourth amplifier output signal to the fourth feed point 126 of the first radiator 120. The total emitted radiation from the first radiator 120 is thus provided from four different power amplifiers. This enables a high output power of the radiation from the first radiator 120 using low cost power amplifiers. The communication device module 200 also comprises an optional first front end network 156 and an optional second front end network 158. The first output 104 is coupled to the first feed point 118 via the first front end network 156. The second output 108 is coupled to the second feed point 122 via the first front end network 156. The third output 112 is coupled to the third feed point 124 via second front end network 158. The fourth output 116 is coupled to the fourth feed point 126 via the second front end network 158. Thus, in contrast to conventional solutions, four power amplifiers feed the each one of the first radiator 120 and the second radiator 148 in four feed points. In solutions according to conventional technology only one or two feed points are used. This requires the amplifiers in conventional solutions to feed more power into each feeding point than what is required in this embodiment of the invention. The lower power requirement for the amplifiers in this embodiment of the invention allow the first power amplifier 102, the second power amplifier 106, the third power amplifier 110 and the fourth power amplifier 114 to be integrated into a first common integrated circuit chip 128 as is indicated by the dashed line in FIG. 1. The first common integrated circuit chip 128 may be based on low cost technology, such as CMOS or MOSFET.

The radio frequency circuit 100 further comprises a fifth power amplifier 130 comprising a fifth output 132, and a fifth input 234, a sixth power amplifier 134 comprising a sixth output 136 and a sixth input 236, a seventh power amplifier 138 comprising a seventh output 140 and a seventh input 238, and an eighth power amplifier 142 comprising an eighth output 144 and an eighth input 240. The radio frequency circuit 100 further comprises an optional second transmitter network 250 with a second network input 252 for a further radio communication signal. The second transmitter network 250 further comprises a fifth network output 254 connected to the fifth input 234 of the fifth power amplifier 130, a sixth network output 256 connected to the sixth input 236 of the sixth power amplifier 134, a seventh network output 258 connected to the seventh input 238 of the seventh power amplifier 138, and an eighth network output 260 connected to the eighth input 240 of the eighth power amplifier 142. The fifth power amplifier 130, the sixth power amplifier 134, the seventh power amplifier 138, and the eighth power amplifier 142 are configured to perform an amplification based on a further radio communication signal, which is input on the second network input 252, to produce a fifth amplifier output signal, a sixth amplifier output signal, a seventh amplifier output signal, and an eighth amplifier output signal. The fifth output 132 is configured to provide the fifth component signal to a fifth feed point 146 of the second radiator 148. The sixth output 136 is configured to provide the sixth component signal to the sixth feed point 150 of the second radiator 148. The seventh output 140 is configured to provide the seventh component signal to a seventh feed point 152 of the second radiator 148. The eighth output 144 is configured to provide the eighth component signal to an eighth feed point 154 of the second radiator 148. The total emitted radiation from the second radiator 148 is thus provided from four different power amplifiers 130, 134, 138, 142. This enables a high output power of the radiation from the second radiator 148 using for example CMOS or MOSFET based power amplifiers. The communication device module 200 also comprises an optional third front end network 264 and an optional fourth front end network 266. The fifth output 132 is coupled to the fifth feed point 146 via the third front end network 264. The sixth output 136 is coupled to the sixth feed point 150 via the third front end network 264. The seventh output 140 is coupled to the seventh feed point 152 via fourth front end network 266. The eighth output 144 is coupled to the eighth feed point 154 via the fourth front end network 266.

The radio frequency circuit 100 according to this second embodiment may be said to consist of two radio frequency amplifier circuits according to the first embodiment of the invention, wherein each one of the two radio frequency amplifier circuits is configured to feed a separate radiator of the antenna element formed by the first radiator 120 and the second radiator 148.

The first power amplifier 102, the second power amplifier 106, the third power amplifier 110, the fourth power amplifier 114, the fifth power amplifier 130, the sixth power amplifier 134, the seventh power amplifier 138, and the eighth power amplifier 142 may be integrated into a second common integrated circuit chip 176 as is indicated by the dashed lines. The first common integrated circuit chip 128 and the second common integrated circuit chip 176 may be united in one common integrated circuit chip.

Preferably, the first sub-radiator 132 is configured to radiate in a first polarization direction, and the second sub-radiator 134 is configured to also radiate in the first polarization direction. Preferably, the third sub-radiator 172 is configured to radiate in a second polarization direction, and the fourth sub-radiator 174 is configured to also radiate in the second polarization direction, wherein the first polarization direction is different from the second polarization direction. Preferably, the first polarization direction is perpendicular to the second polarization direction. The two sub-radiators may be integrated as two parts of a radiator, the radiator in turn being integrated as one of the two parts of an antenna element.

Figure 4:
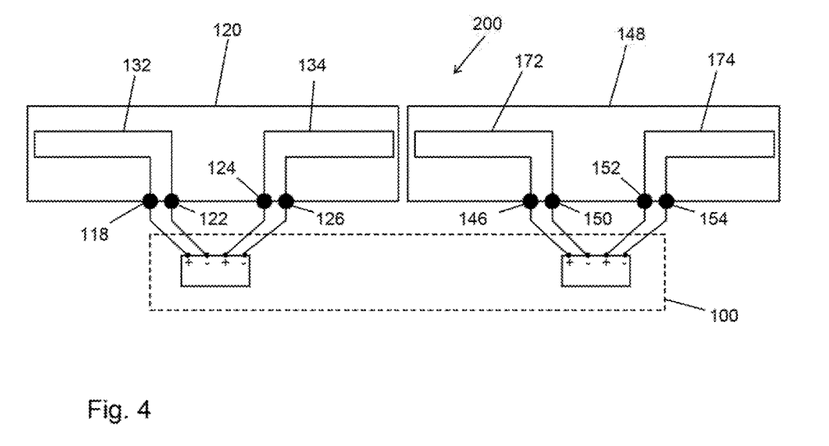
FIG. 4 shows schematically a communication device module according to a third embodiment of the present invention, which communication device module comprises a radio frequency circuit, a first radiator, and a second radiator.

FIG. 4 shows schematically a communication device module 200 according to a third embodiment, which communication device module 200 comprises a radio frequency circuit 100, a first radiator 120, and a second radiator 148. The first radiator 120 comprises a first sub-radiator 132 and a second sub-radiator 134, wherein the first sub-radiator 132 comprises the first feed point 118 and the second feed point 122, and wherein the second sub-radiator 134 comprises the third feed point 124 and the fourth feed point 126. The second radiator 148 comprises a third sub-radiator 172 and a fourth sub-radiator 174, wherein the third sub-radiator 172 comprises the fifth feed point 146 and the sixth feed point 150, and wherein the fourth sub-radiator 174 comprises the seventh feed point 152 and the eighth feed point 154.

Figure 5:
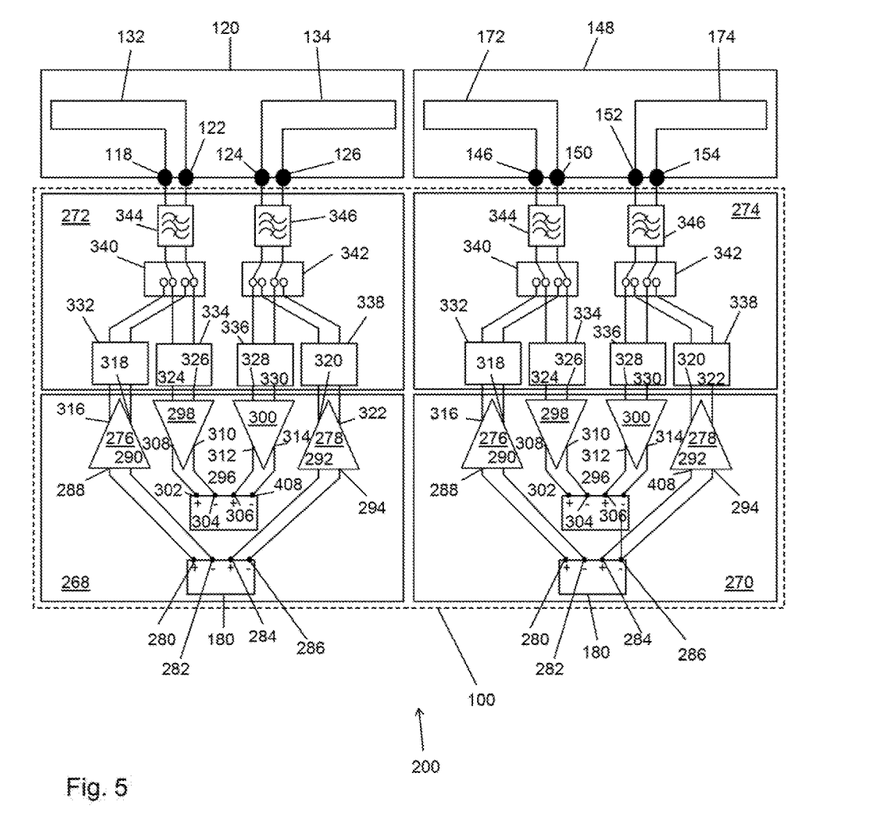
FIG. 5 shows a communication device module according to a fourth embodiment of the present invention, which communication device module comprises a radio frequency circuit according to a third embodiment.

FIG. 5 shows in more detail the communication device module 200 according to a fourth embodiment shown in FIG. 4, which communication device module 200 comprises a radio frequency circuit 100 according to a third embodiment a first radiator 120 and a second radiator 148. The first radiator 120 and the second radiator 148 together form an antenna element. The first radiator 120 comprises a first sub-radiator 132 and a second sub-radiator 134, wherein the first sub-radiator 132 comprises the first feed point 118 and the second feed point 122, and wherein the second sub-radiator 134 comprises the third feed point 124 and the fourth feed point 126. The second radiator 148 comprises a third sub-radiator 172 and a fourth sub-radiator 174, wherein the third sub-radiator 172 comprises the fifth feed point 146 and the sixth feed point 150, and wherein the fourth sub-radiator 174 comprises the seventh feed point 152 and the eighth feed point 154. The radio frequency circuit 100 comprises a first transceiver 268, a second transceiver 270, a first front end network 272 and a second front end network 274. As the first transceiver 268 and the second transceiver 270 are identical and the first front end network 272 and the second front end network 274 are identical only the first transceiver 268 and the first front end network 272 will be described. The same reference numerals will be used for the components in the first transceiver 268 and the components in the second transceiver 270. Furthermore, the same reference numerals will be used for the components in the first front end network 272 and the components in the second front end network 274. The first transceiver 268 comprises a transmitter network 180, a first differential power amplifier 276 and a second differential power amplifier 278. The first differential power amplifier 276 may preferably comprise the first power amplifier 102 and the second power amplifier 106 as has been described in relation to FIG. 1 and FIG. 2. The transmitter network 180 has a first positive output 280 that may correspond to the first transmitter output 184 in FIG. 1 and FIG. 2, a first negative output 282 that may correspond to the second transmitter output 186 in FIG. 1 and FIG. 2, a second positive output 284 that may correspond to the third transmitter output 188 in FIG. 1 and FIG. 2, and a second negative output 286 that may correspond to the fourth output 190 in FIG. 1 and FIG. 2. The first differential power amplifier 276 comprises a first positive input 288 which is connected to the first positive output 280 of the transmitter network 180. The first differential power amplifier 276 further comprises a first negative input 290 which is connected to the first negative output 282 of the transmitter network 180. The second differential power amplifier 278 comprises a first positive input 292 which is connected to the second positive output 284 of the transmitter network 180. The second differential power amplifier 278 further comprises a first negative input 294 which is connected to the second negative output 286 of the transmitter network 180. The first differential power amplifier also comprises a first output 316 and a second output 318. The second differential power amplifier also comprises a third output 320 and a fourth output 322.

The first transceiver 268 comprises a receiver network 296 comprising a first positive input 302, a first negative input 304, a second positive input 306, and a second negative input 408. The first transceiver 268 also comprises a first differential low noise amplifier 298 with a first positive output 308 connected to the first positive input 302 of the receiver network 296 and a first negative output 310 connected to the first negative input 304 of the receiver network. The first transceiver 268 also comprises a second differential low noise amplifier 300 with a second positive output 312 connected to the second positive input 302 of the receiver network 296 and a second negative output 314 connected to the first negative input 304 of the receiver network 296. The first differential low noise amplifier 298 also comprises a first input 324 and a second input 326. The second differential low noise amplifier 300 also comprises a third input 328 and a fourth input 330.

The first front end network 272 comprises a first matching network 332, a second matching network 334, a third matching network 336 and a fourth matching network 338. The first front end network also comprises a first switch 340 (for switching between transmit and receive), a second switch 342 (for switching between transmit and receive), a first filter 344 and a second filter 346. The first output 316 is connected to the first feed point 118 via the first matching network 332, the first switch 340 and the first filter 344. The second output 318 is connected to the second feed point 122 via the first matching network 332, the first switch 340 and the first filter 344. The third output 320 is connected to the third feed point 124 via the fourth matching network 338, the second switch 342 and the second filter 346. The fourth output 322 is connected to the fourth feed point 126 via fourth matching network 338, the second switch 342 and the second filter 346. The first input 324 of the first differential low noise amplifier 298 is connected to the first feedpoint 118 via the second matching network 334, the first switch 340 and the first filter 344. The second input 326 of the first differential low noise amplifier 298 is connected to the second feedpoint 122 via the second matching network 334, the first switch 340 and the first filter 344. The third input 328 of the first differential low noise amplifier 298 is connected to the third feedpoint 124 via the third matching network 336, the second switch 342 and the second filter 346. The fourth input 330 of the first differential low noise amplifier 298 is connected to the fourth feedpoint 124 via the third matching network 336, the second switch 342 and the second filter 346. The first switch 340 and the second switch 342 are configured to control whether the first radiator 120 is to be connected to the receiver network 296 or to the transmitter network 180.

The transmitters may comprise several smaller blocks which may comprise digital signals processing, digital to analog converters, baseband filtering, RF modulators, filtering, RF splitters, etc. Correspondingly the receivers may contain combiners, demodulators, baseband filters, and analog to digital converters. The received signals may be combined either in analog or digital domain. Having two receivers can be configured to receive only half of the bandwidth, which may ease the requirements for certain components. Also, since the antenna element, constituted by the first radiator 120 and the second radiator 148, splits the signal evenly to two RX inputs, the linearity requirements for each RX are easier.

Figure 6:
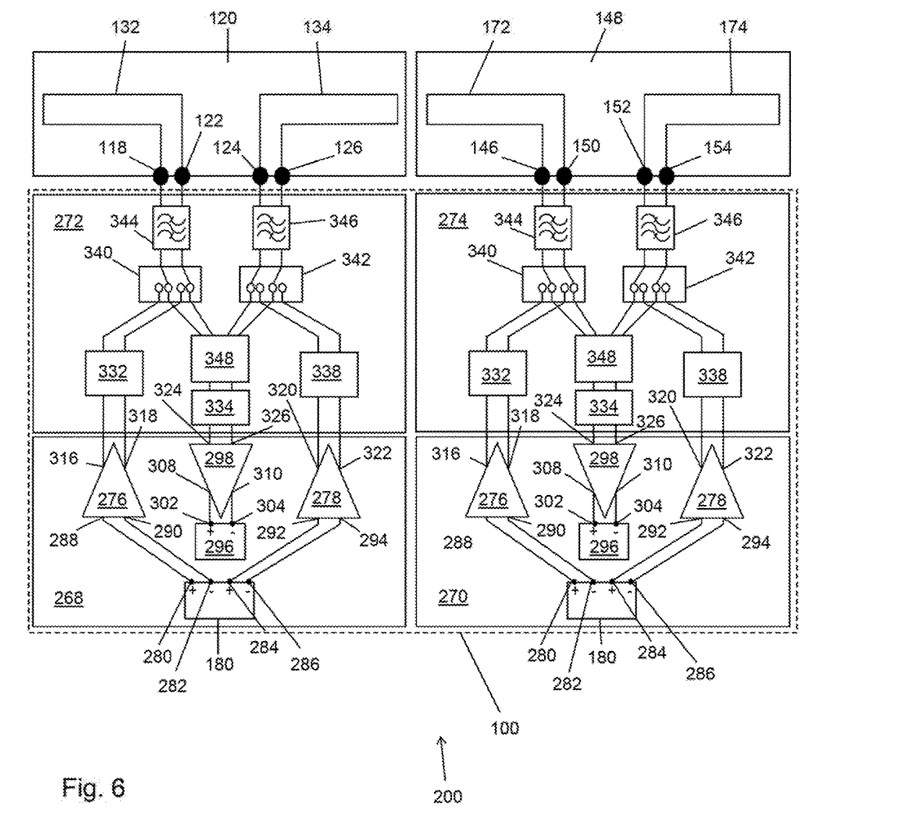
FIG. 6 shows a communication device module according to a fifth embodiment of the present invention, which communication device module comprises a radio frequency circuit according to a fourth embodiment of the present invention.

FIG. 6 shows in more detail the communication device module 200 according to the third embodiment shown in FIG. 4, which communication device module 200 comprises a radio frequency circuit 100 according to a third embodiment. The differences between FIG. 5 and FIG. 6 will be described. Instead of two differential low noise amplifiers the communication device module 200 in FIG. 6 only has one differential low noise amplifier 298 and only one matching network 334 connected to the differential low noise amplifier 298. The received signal is combined into the input of said differential low noise amplifier 298. This may reduce the size and power consumption of the receiver, but also it requires that the receiver can tolerate double input power. Each one of the first front end network 272 and the second front end network 274 comprise a combiner 348 arranged between the switches 340, 342 and the second matching network 334.

A communication device, such as a massive MIMO system, may comprise a large number of communication device modules according to embodiments of the present invention as described above.

The invention claimed is:

1. A radio frequency circuit comprising:
a first power amplifier comprising a first output;
a second power amplifier comprising a second output;
a third power amplifier comprising a third output; and
a fourth power amplifier comprising a fourth output,
wherein:
the first power amplifier, the second power amplifier, the third power amplifier and the fourth power amplifier are configured to perform an amplification based on a radio communication signal to produce a first amplifier output signal, a second amplifier output signal, a third amplifier output signal, and a fourth amplifier output signal,
the first output is configured to provide the first amplifier output signal to a first feed point of a first radiator,
the second output is configured to provide the second amplifier output signal to a second feed point of the first radiator,
the third output is configured to provide the third amplifier output signal to a third feed point of the first radiator, and
the fourth output is configured to provide the fourth amplifier output signal to a fourth feed point of the first radiator;
a first front end network; and
a second front end network,
wherein:
the first output is coupled to the first feed point via the first front end network,
the second output is coupled to the second feed point via the first front end network,
the third output is coupled to the third feed point via second front end network, and
the fourth output is coupled to the fourth feed point via the second front end network.

2. The radio frequency circuit according to claim 1, further comprising a first front end network, a second front-end network, a third front end network and a fourth front end network,
wherein the first output is coupled to the first feed point via the first front end network,
wherein the second output is coupled to the second feed point via the second front end network,
wherein the third output is coupled to the third feed point via the third front end network,
wherein the fourth output is coupled to the fourth feed point via the fourth front end network.

3. The radio frequency circuit according to claim 1, wherein the first power amplifier, the second power amplifier, the third power amplifier and the fourth power amplifier are integrated into a first common integrated circuit chip.

4. The radio frequency circuit according to claim 1, wherein at least the first power amplifier is a differential power amplifier.

5. The radio frequency circuit according to claim 1, wherein at least the first power amplifier comprises a first pair of single ended power amplifiers and a first combiner, each single ended power amplifier of the first pair being configured to perform an amplification based on the radio communication signal,
wherein the first combiner is coupled between outputs of the single ended power amplifiers of the first pair and the first output of the first power amplifier to provide the first amplifier output signal.

6. The radio frequency circuit according to claim 1, wherein the radio communication signal is a differential radio communication signal having a first component signal and a second component signal,
wherein the first power amplifier is configured to perform an amplification based on the first component signal to produce the first amplifier output signal,
wherein the second power amplifier is configured to perform an amplification based on the second component signal to produce the second amplifier output signal,
wherein the third power amplifier is configured to perform an amplification based on the first component signal to produce the third amplifier output signal, and
wherein the fourth power amplifier is configured to perform an amplification based on the second component signal to produce the fourth amplifier output signal.

7. A radio frequency circuit comprising:
a first power amplifier comprising a first output;
a second power amplifier comprising a second output;
a third power amplifier comprising a third output;
a fourth power amplifier comprising a fourth output,
wherein:
   the first power amplifier, the second power amplifier, the third power amplifier and the fourth power amplifier are configured to perform an amplification based on a radio communication signal to produce a first amplifier output signal, a second amplifier output signal, a third amplifier output signal, and a fourth amplifier output signal,
   the first output is configured to provide the first amplifier output signal to a first feed point of a first radiator,
   the second output is configured to provide the second amplifier output signal to a second feed point of the first radiator,
   the third output is configured to provide the third amplifier output signal to a third feed point of the first radiator, and
   the fourth output is configured to provide the fourth amplifier output signal to a fourth feed point of the first radiator;
a fifth power amplifier comprising a fifth output;
a sixth power amplifier comprising a sixth output;
a seventh power amplifier comprising a seventh output; and
an eighth power amplifier comprising an eighth output,
wherein:
   the fifth power amplifier, the sixth power amplifier, the seventh power amplifier, and the eighth power amplifier are configured to perform an amplification based on a further radio communication signal to produce a fifth amplifier output signal, a sixth amplifier output signal, a seventh amplifier output signal, and an eighth amplifier output signal,
   the fifth output is configured to provide the fifth component signal to a fifth feed point of a second radiator,
   the sixth output is configured to provide the sixth component signal to a sixth feed point of the second radiator,
   the seventh output is configured to provide the seventh component signal to a seventh feed point of the second radiator, and
   the eighth output is configured to provide the eighth component signal to an eighth feed point of the second radiator.

8. The radio frequency circuit according to claim 7, wherein the first power amplifier, the second power amplifier, the third power amplifier, the fourth power amplifier, the fifth power amplifier, the sixth power amplifier, the seventh power amplifier, and the eighth power amplifier are integrated into a common integrated circuit chip.

9. A communication device module comprising:
a first radiator;
a radio frequency circuit comprising:
   a first power amplifier comprising a first output;
   a second power amplifier comprising a second output;
   a third power amplifier comprising a third output; and
   a fourth power amplifier comprising a fourth output,
   wherein:
      the first power amplifier, the second power amplifier, the third power amplifier and the fourth power amplifier are configured to perform an amplification based on a radio communication signal to produce a first amplifier output signal, a second amplifier output signal, a third amplifier output signal, and a fourth amplifier output signal,
      the first output is configured to provide the first amplifier output signal to a first feed point of the first radiator,
      the second output is configured to provide the second amplifier output signal to a second feed point of the first radiator,
      the third output is configured to provide the third amplifier output signal to a third feed point of the first radiator, and
      the fourth output is configured to provide the fourth amplifier output signal to a fourth feed point of the first radiator;
a first front end network; and
a second front end network,
wherein:
   the first output is coupled to the first feed point via the first front end network,
   the second output is coupled to the second feed point via the first front end network,
   the third output is coupled to the third feed point via second front end network, and
   the fourth output is coupled to the fourth feed point via the second front end network,
wherein:
   the first radiator comprises a first sub-radiator and a second sub-radiator,
   the first sub-radiator comprises the first feed point and the second feed point, and
   the second sub-radiator comprises the third feed point and the fourth feed point.

10. The communication device module according to claim 9,
wherein the first sub-radiator is configured to radiate in a first polarization direction, and
wherein the second sub-radiator is configured to also radiate in the first polarization direction.

11. A communication device module, comprising
a first radiator;
a second radiator;
a radio frequency circuit comprising:
   a first power amplifier comprising a first output;
   a second power amplifier comprising a second output;
   a third power amplifier comprising a third output;
   a fourth power amplifier comprising a fourth output,
   wherein:
      the first power amplifier, the second power amplifier, the third power amplifier and the fourth power amplifier are configured to perform an amplification based on a radio communication signal to produce a first amplifier output signal, a second amplifier output signal, a third amplifier output signal, and a fourth amplifier output signal,
      the first output is configured to provide the first amplifier output signal to a first feed point of the first radiator,
      the second output is configured to provide the second amplifier output signal to a second feed point of the first radiator,
      the third output is configured to provide the third amplifier output signal to a third feed point of the first radiator, and the fourth output is configured to provide the fourth amplifier output signal to a fourth feed point of the first radiator;

a fifth power amplifier comprising a fifth output;

a sixth power amplifier comprising a sixth output;

a seventh power amplifier comprising a seventh output; and an eighth power amplifier comprising an eighth output, wherein:

the fifth power amplifier, the sixth power amplifier, the seventh power amplifier, and the eighth power amplifier are configured to perform an amplification based on a further radio communication signal to produce a fifth amplifier output signal, a sixth amplifier output signal, a seventh amplifier output signal, and an eighth amplifier output signal, the fifth output is configured to provide the fifth component signal to a fifth feed point of the second radiator, the sixth output is configured to provide the sixth component signal to a sixth feed point of the second radiator, the seventh output is configured to provide the seventh component signal to a seventh feed point of the second radiator, and the eighth output is configured to provide the eighth component signal to an eighth feed point of the second radiator, wherein the first radiator comprises a first sub-radiator and a second sub-radiator (134), wherein the first sub-radiator comprises the first feed point and the second feed point, wherein the second sub-radiator comprises the third feed point and the fourth feed point, and wherein the second radiator comprises a third sub-radiator and a fourth sub-radiator, wherein the third sub-radiator comprises the fifth feed point and the sixth feed point, wherein the fourth sub-radiator comprises the seventh feed point and the eighth feed point.

12. The communication device module according to claim 11, wherein the first sub-radiator is configured to radiate in a first polarization direction, and wherein the second sub-radiator is configured to also radiate in the first polarization direction.

13. The communication device module according to claim 12, wherein the third sub-radiator is configured to radiate in a second polarization direction, wherein the fourth sub-radiator is configured to also radiate in the second polarization direction, and wherein the first polarization direction is different from the second polarization direction.

14. The communication device module according to claim 13, wherein the first polarization direction is perpendicular to the second polarization direction.

* * * * *